Figure 1:
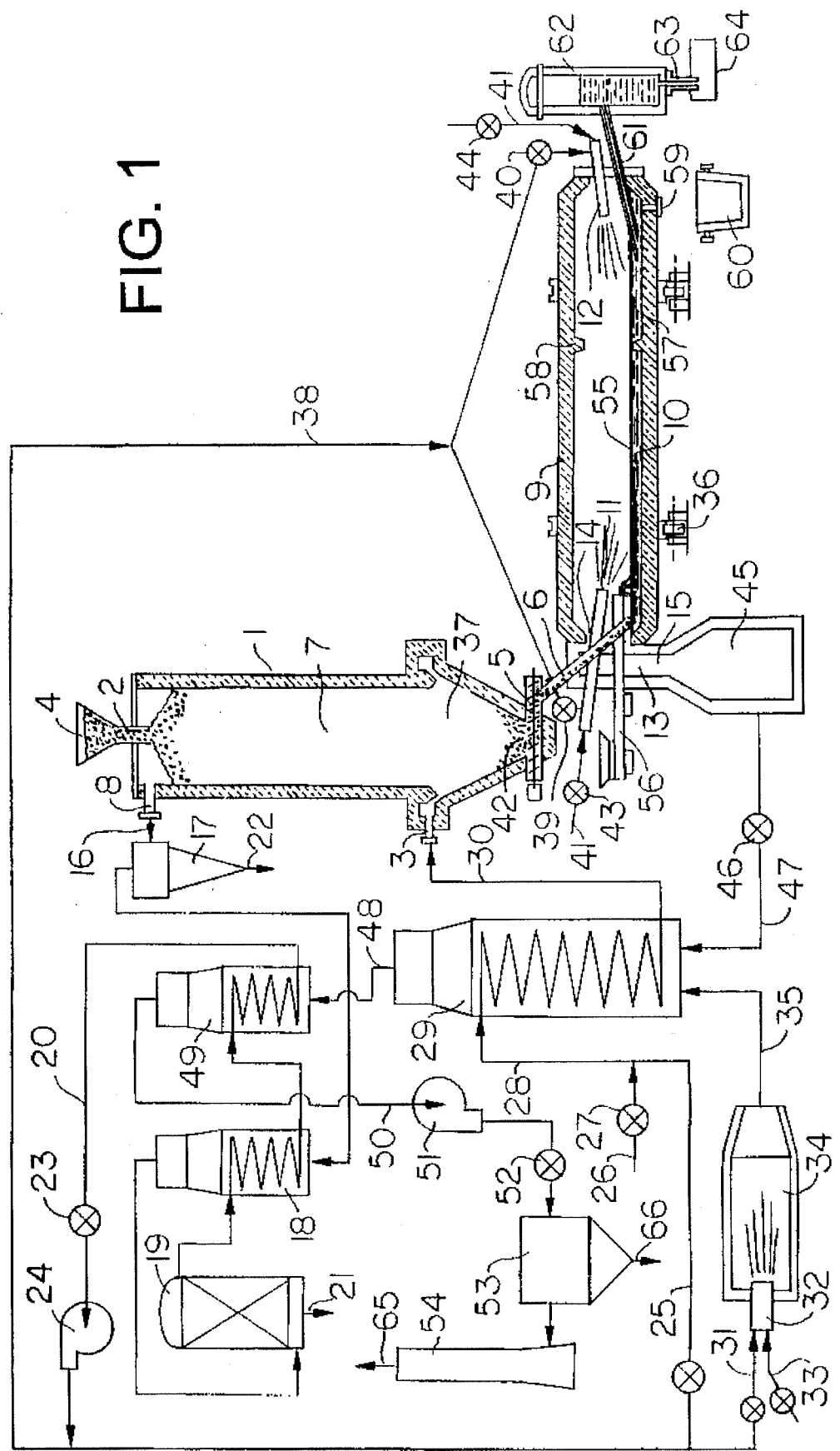

United States Patent [19]
Sherwood

[11] Patent Number: 5,542,963
[45] Date of Patent: Aug. 6, 1996

[54] DIRECT IRON AND STEELMAKING

[76] Inventor: William L. Sherwood, 7249 Cypress Street, Vancouver, British Columbia, Canada, V6P 5M2

[21] Appl. No.: 308,540

[22] Filed: Sep. 21, 1994

[51] Int. Cl.⁶ .................................................. C21B 13/08
[52] U.S. Cl. ............................................ 75/382; 75/476
[58] Field of Search ............................. 75/476, 505, 527, 75/382

[56] References Cited

U.S. PATENT DOCUMENTS 3,514,280  5/1970  Sherwood ................................. 75/527

*Primary Examiner*—Melvyn Andrews

[57] ABSTRACT

The process of the invention comprises gaseous reduction of iron oxides in solid state combined with concurrent melting of the hot reduced iron within a closed system without cooling down the charge or exposing it to the outside atmosphere. It incorporates the continuous recycling of a major portion of the off-gases from reduction, and fully utilizes the chemical heat contained in the fuel and reductant by substantially complete oxidation to $CO_2$ and $H_2O$ in the system gaseous reaction products and recovery of their sensible heat, prior to final exhaustion as waste gases. Features include dewatering of the off-gas from reduction, enriching with hydrocarbon and recycling a major portion, and separately combusting a minor portion for transfer of the sensible heat to the enriched major portion, and also usually the combustion of a second minor portion with oxygen as fuel for melting, with the sensible heat of these combustion products also utilized for heating the enriched and recycled portion. The reduction stage is suitably conducted in a gas-solid reaction zone within a shaft furnace, and the melting in a gas-solid-liquid reaction zone within a rotary furnace which also contains a gas-liquid reaction zone adapted for controlling of the liquid iron temperature and composition. Supplemental materials such as iron and steel scrap, alloys and fluxes may be added directly into the rotary furnace, and the product may be discharged either batchwise or continuously be siphon into an evacuated withdrawal chamber for final alloying and refining prior to casting.

23 Claims, 2 Drawing Sheets

AC: $Fe_3O_4 + CO = 3FeO + CO_2$
or $Fe_3O_4 + H_2 = 3FeO + H_2O$

BC: $FeO + CO = Fe + CO_2$
or $FeO + H_2 = Fe + H_2O$

DC: $\frac{1}{4}Fe_3O_4 + CO = \frac{3}{4}Fe + CO_2$
or $\frac{1}{4}Fe_3O_4 + H_2 = \frac{3}{4}Fe + H_2O$

AREA ABC: WUSTITE

DIRECT IRON AND STEELMAKING

The invention relates to the manufacture of iron and steel and, more particularly, is drawn to an integrated process for direct iron and steelmaking.

The major portion of integrated steel plants continue to employ the blast furnace process combining iron oxide reduction with fusion of the iron to yield a carbon-saturated liquid, followed by batch-wise transfer of the liquid iron to the basic oxygen process in one of its various forms, where the carbon is oxidized in a separate steelmaking step. A minor portion now employ a solid-state direct reduction process producing direct-reduced iron without fusion, across a range of carbon contents, which is subsequently transported to another process and melted, most commonly by the electric-arc furnace process, for the steelmaking step.

A majority of the solid-state reduction processes currently operating feature a descending, moving bed of iron oxide materials within a vertical shaft or retort vessel, though which hot reducing gases rise countercurrently, and which are partially oxidized as they reduce the oxides to metallic iron. A minority utilize a fluidized bed of iron oxide materials, in which relative gas-to-particle movement is more random. The off-gases contain unreacted reducing gases and a substantial portion are therefore re-enriched with hydrocarbons or hydrocarbon reaction products and recycled, after removing $H_2O$ or $CO_2$, or both. The balance are usually combusted to generate heating gases to balance the product, chemical reaction and thermal loss energy requirements of the overall process.

The reducing gases, principally $H_2$ and CO, are generated from a range of hydrocarbon sources including natural gas, synthetic gases, coal and fuel oil. They are reformed catalytically or by partial combustion in-process or in gas generators, or various combinations, by reaction of hydrocarbons with recycle gas, steam or other oxidants. Reforming is accomplished outside the top gas recycling loop, catalytically within the loop either in an external reformer or within the furnace, or in combustion chambers in the loop but external to the furnace. All of these combinations are currently known in the art of direct reduction.

It is a major object of the present invention to integrate solid state reduction with iron melting and steelmaking in a combination utilizing hydrocarbon fuels as the combined energy source with interconnecting utilization of exhaust gas heat content between reduction and melting stages, including elimination of in-process charge cooling heat losses between process stages.

Another object is to produce molten iron or steel directly from iron ore, iron ore pellets, or the like, whilst providing for concurrent steady-state operation of the sequential process stages, and avoiding intermediate discharge, accumulation, transfer, storage, etc. of in-process materials between process stages.

Another object is to provide flexible composition control across various grades of cast iron and steel product specification requirements.

Still another object is to provide for direct utilization of a range of hydrocarbons such as natural gas, producer gas, petroleum oil and coal, as fuels for iron and steelmaking, without intermediate thermal generation of electric power.

A further object is to reduce overall energy consumption by making use of waste energy from each process stage for other stages, attaining complete reaction of hydrocarbon fuels to $H_2O$ and $CO_2$ as nearly the only gaseous reaction products, and minimizing the quantity and temperature of product gases exhausted to atmosphere.

A still further object is to minimize the quantity of particulates and gaseous pollutants discharged into the environment.

Other objects include simple process equipment, high yields, low capital costs, low operating and maintenance costs, and flexibility as to size of operation.

Although various forms of hydrocarbon-fuel-fired melting furnaces are known, rotary furnaces incorporate some particularly advantageous features for the continuous melting of hot reduced iron. These include much higher heating rates than a stationary furnace, as results from flame-to-wall followed by wall-to-charge heat transfer during each rotation, elongated reaction zones, facility of complete combustion of the heating fueled by oxidant within the furnace and continuous wall movement assuring agitation, advancement and lack of pileup of the charge during melting. Accordingly, a major aspect of the invention is a process for direct iron and steelmaking comprising the following steps:

a) maintaining a gas-solid reaction zone within a reduction reactor adapted for heating and reduction of a charge of iron oxide materials to obtain metallic iron, by contact with hot process gases containing $H_2$ and CO;

b) maintaining a gas-solid-liquid reaction zone within a rotary furnace adapted for melting within a partially fused bath by heat transferred from the rotating furnace walls in contact with said bath during furnace rotation;

c) feeding iron oxide materials into said reduction reactor;

d) transferring said solid metallic iron from said gas-solid reaction zone into said gas-solid-liquid reaction zone substantially without cooling or exposure to the outside atmosphere of said iron;

e) supplying heat by introducing fuel and oxidant for combustion to form hot gaseous combustion products comprising $CO_2$ and $H_2O$ within said rotary furnace from which heat is transferred to said walls and said bath, thereby melting said solid metallic iron to form liquid metallic iron in said gas-solid-liquid reaction zone;

f) exhausting top gas containing $H_2O$ and $CO_2$ as well as unreacted $H_2$ and CO from said gas-solid reaction zone;

g) removing a major portion of the $H_2O$ contained in said top gas;

h) mixing a major portion of said dewatered top gas together with reducing gases to form an enriched gas mixture;

i) exhausting said gaseous combustion products of said fuel and oxidant in step (e) from said rotary furnace and transferring sensible heat contained therein to comprise sensible heat of said enriched gas mixture from step (h);

j) supplying additional heat to said enriched gas mixture sufficient to sustain said heating and reduction of iron oxide materials to yield hot solid metallic iron;

k) recycling said enriched gas mixture into said reduction reactor; and l) discharging of said liquid metallic iron and slag from said gas-solid-liquid reaction zone.

Reforming of hydrocarbons by catalysis by contact with hot reduced metallic iron within the gas-solid reaction zone can act in place of separate reformer equipment, in embodiments wherein the reducing gases in step (9) comprise hydrocarbons and step (j) includes recycling the enriched gas mixture into the reduction reactor at a location to contact reduced metallic iron, where the hydrocarbons react to form $H_2$ and CO to comprise the hot process gases which react with the iron oxide materials to yield solid metallic iron. In view of the large heat requirements of endothermic chemical reaction in the gas-solid reaction zone, in the preferred embodiments step (i) comprises combusting a minor portion of the dewatered top gas with oxidant to produce hot gaseous combustion product and transferring sensible heat contained therein to comprise sensible heat of the enriched gas mixture from step (g).

Introducing hydrocarbon fuels/reductants primarily only into the gas-solid reaction zone gas recycling circuit and employing a minor portion of the dewatered top gas as the principal fuel for combustion within the rotary furnace in step (e) enhances the reducing power of the gas-solid reaction zone gases and thus reaction intensity is enhanced, whilst preserving the ability to maintain adequate melting heat intensity in the gas-solid-liquid reaction zone. Gaseous oxygen or oxygen-enriched air is preferably utilized as the oxidant for melting, although preheated air could be used if oxygen is unavailable.

The enriched gas mixture from step (g) is preferably heated to a temperature in the range of 850°14 1150° C. by step (h) and (i) for recycling in step (j), most usually about 1050° C. Most commonly, the process of the invention includes the steps of introducing additional materials, such as scrap iron and steel, fluxing materials, alloying materials and carbon as additives directly into the rotary furnace for melting and reaction along with the metallic iron transferred from the reactor in step (d) and providing a gas-liquid reaction zone within the rotary furnace into which the discharging of liquid metallic iron in step (k) takes place as well as slag formed by fusion of gangue and residual oxides of the iron oxide materials, fluxes and impurities present; adjusting the temperature and composition of the liquid iron by controlled combustion of fuel and oxidant within the gas-liquid reaction zone to yield liquid iron and steel of controlled temperature and composition. This may be siphoned from the rotary furnace into a vacuum withdrawal vessel for alloying and other processing in preparation for casting, with the bulk of the slag discharged separately. It is preferred that the various process steps are conducted concurrently and continuously. Also, recovery of sensible heat for recycling can be minimized, such as by a step of extracting sensible heat contained in the top gas in step (f) prior to removing of water vapor, for in-process recovery and recycling as part of the sensible heat contained in said enriched gas mixture in step (j).

The invention also encompasses embodiments wherein the hot process gases in step (a) are at lower temperatures, such as when the enriched gas mixture in step (g) is heated to only 500°–850° C. by steps (h) and (j), causing deposition of carbon and formation of iron carbide, $Fe_3C$, compound. Alternatively, these can be formed by additional hydrocarbon introduced for reaction and partial cooling of the metallic iron just prior to step (d).

Figure 2:
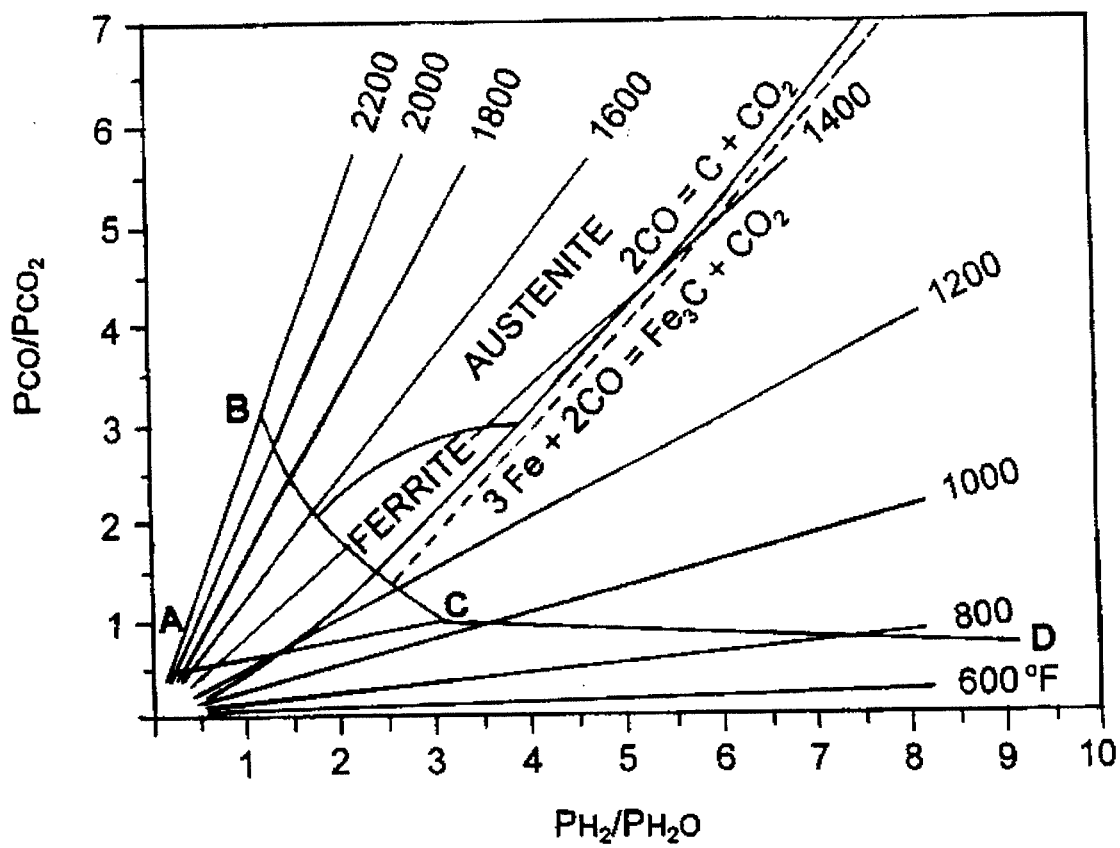

Various other objects, features and advantages of the process of this invention will become apparent from the following detailed description and claims, and by referring to the accompanying drawings, in which:

FIG. 1 is a flowsheet diagram illustrating basic features of the process of this invention; and FIG. 2 is a graph of equilibrium values of the iron-oxygen-hydrogen-carbon system at one atmosphere pressure, illustrating reaction relationships influencing reduction-reactor solid and gaseous in-process compositions.

Referring to the flowsheet FIG. 1, which is generally illustrative of process material and gas flow during steady-state continuous operating conditions, reduction reactor 1 includes a feed inlet 2 for solid iron oxide materials 4 commonly in the form of pellets or lumps, a gas inlet 3 for process gases and a solids outlet 42. A variety of alternative charging systems and internal configurations of reduction reactors are know in the art of direct reduction of iron with gaseous reductants. The gases introduced at inlet 3 percolate through the gas-solid reaction zone 7 countercurrent to the general movement of solid charge and exit via reacted gas outlet 8.

The hot reduced iron is discharged by means of screw conveyor 5, or a rotary discharge valve or the like, into transfer conduit 6 adapted for transferring the hot iron and charging it into gas-solid-liquid reaction zone 10 of rotary furnace 9. This transfer appropriately may be assisted by a pressurized carrier gas introduced to flow through tube 6 propelling the hot iron, an normally of inert or non-oxidizing composition relative to hot metallic iron, such as recycled and reheated reactor top gas. The delivery end of conduit 9 may also include an oscillating or screw conveyor section, appropriately water-cooled, which may or may not be preceded by an intermediate buffer storage vessel for accumulating hot iron, and out of which the flow into rotary furnace 9 is metered, optimally with a second carrier gas entry point. Rotary furnace 9, rotated on rollers 36, carries a bath of partially melted charge mixture in a gas-solid-liquid reaction zone 10, and is fired by a charge end burner 11 and discharge end burner 12. The hot combustion products 13 exit the rotary furnace charge opening 14 via exhaust duct 15.

The composition of gases within the upper portion of the gas-solid reaction zone 7 move towards the water-gas equilibrium values with iron and iron oxides as illustrated in diagram FIG. 2. The dust-laden top gases 16, which typically contain about 15 percent moisture, are passed via an intermediate dry cyclone dust collector 17 and/or heat recuperator 18, or directly to a gas cooler-scrubber 19, where cooling takes place, typically to the 40° to 60° C. range, with the effect of condensing out and removing the major portion of the contained water vapor, along with the remaining iron oxides and other particulates. After cooling, the composition of dewatered top gas 20 could typically be in the range of about 25–29 per cent CO, 18–22 per cent $CO_2$, 42–48 per cent $H_2$, 0.5–2.5 per cent $CH_4$, 1–3 per cent $N_2$ and 0.5–2.5 per cent $H_2O$. More extensive scrubbing and chemical procedures to remove $CO_2$ optionally may be included to further decrease the oxidation degree and increase the reducing power of the recovered top gases 20. The dust-laden condensate 21 from gas cooler-scrubber 19 may be dewatered, such as in a settling pond, a thickener, or thickener-filter combination, and the dust may be disposed of, or reagglomerated or otherwise reprocessed as a component of charge materials 4. Dust particulates 22 may be similarly recycled.

The cooled, or cooled and partly reheated top gases 20 are compressed by compressor-blower 24 and the major portion 25 is mixed with fresh hydrocarbon 26, such as natural gas containing methane, $CH_4$, as the major constituent, thereby creating an enriched gas mixture 28 which is reheated by heat exchanger 29 to a temperature generally in the range of 850° to 1150° C. and typically 1050° C. for introduction as an enriched preheated gas mixture 30 into reactor 1 at a location 37 containing a substantial proportion of reduced metallic iron. This iron acts as a catalyst for gas reforming reactions, for example, converting a major portion of the $CH_4$ into carbon monoxide, CO and hydrogen, $H_2$, which are more effective than methane as reducing gases for the iron oxides to metallic iron. Gas mixture 30 is typically at a pressure in the range of 1–2 bar and a flow rate of 800–1500 cubic meters per tonne of iron processed. The hydrocarbons 26 can be introduced at other locations in the circuitry, for example, to avoid possible carbon deposition, or sooting, within heat exchanger 29, hydrocarbons could be introduced into stream 30 following passage through exchanger 29. In this case, they may also be preheated by additional coils in exchangers 18, 29 or 49 illustrated, or by another exchanger.

In the embodiment illustrated, a second portion of top gas 31 is introduced into burlier 32 as fuel for combustion with air and/or oxygen 33 within combustion chamber 34, to yield hot combustion products 35 for introduction into heat exchanger 29. The third portion is utilized as fuel 38 for burners 11 and 12, with flow controlled by valves 39, 40 and is introduced with oxygen or oxygen-enriched air 41, as controlled by valves 43, 44, for combustion within rotary furnace 9. Hot combustion products 13, typically at 1600°–1800° C. and at near-atmospheric pressure, as controlled by water-cooled damper 46, may be conditioned within a dust and slag settling chamber 45, which may include the introduction of fine spray water or steam. The hot conditioned gases 47 are then passed through heat exchanger 29 complementary to hot gases 35, transferring contained sensible heat into recirculated enriched gas mixture 30. Additional heat recuperation may also be accomplished by a heat exchanger 49 adapted for transferring residual sensible heat contained in partially cooled gases 48 to the full stream of dewatered top gas 20. Cooled exhaust gases 50 are vented to atmosphere via exhaust blower 51, exhaust flow control damper 52, dust collector 53, stack 54 and collected particulates 66 are discharged for disposal.

In the gas-solid-liquid reaction zone 10 of furnace 9, gangue constituents contained in the original charge materials 4, such as silica, alumina, etc. form a slag layer 55 to float on the metal bath surface. Fluxing materials, such as lime and dolomite, may be charged by feed pipe or water-cooled oscillating conveyor 56 to adjust and control the slag composition, melting point and fluidity. Additional metallic iron and other metals such as scrap iron and steel, as well as supplementary carbon and alloys, may also be charged directly into zone 10 as supplementary charge material, in addition to the reduced hot metallic iron from reactor 1.

In the embodiment illustrated, the melted charge in the gas-solid-liquid reaction zone 10 is also passed on to a gas-liquid reaction zone 57, as partially separated by annular refractory dam 58, for temperature and composition-adjustment refining prior to discharge. The gas-liquid reaction zone 57 is heated by a discharge end burner 12 and the gas-solid-liquid zone directly by charge end burner 11, supplemented by the available heat remaining in burner 12 combustion products as they pass through gas-solid-liquid reaction zone 10. Discharge of liquid metal may take place either into a ladle 60 via furnace tap hole 59, or via siphon tube 61 into vacuum withdrawal vessel 62, where alloying may be carried out to produce iron or steel of controlled composition for casting. In this mode, a metal throttling valve for the stream through withdrawal vessel discharge nozzle 63 may serve to balance metal outflow with inflow into furnace 9 and regulate the level of metal and slag therein. Liquid metal may be passed directly into tundish 64 enabling continuous casting at a rate corresponding to rate of continuous production through reactor 1 and rotary furnace 10. Since flow of gases within furnace 9 is generally countercurrent to the movement of charge in process, heat output from burner 12 can be adjusted to closely control the discharge temperature.

According to the invention, therefore, the carbon and hydrogen contained in the hydrocarbon employed as fuel and reductant is substantially all fully reacted to $H_2O$ and $CO_2$, without appreciable discharge of combustibles $H_2$ and CO. Further, after heat recuperation as in units 18, 29 and 49, the exhausted gases are at relatively low temperature, typically in the area of 500° C. or even lower when heat exchanger 49 is included. For example, overall fuel and reductant energy consumption at 40 tons of liquid steel per hour is about 11 GJ per tonne, typically as natural gas. Of the carbon contained in the fuel, mostly combined as methane, $CH_4$, more than 99 per cent would typically be discharged in waste gases 65, mainly as $CO_2$, much of the balance being dissolved in the liquid iron and steel product. Of the hydrogen, 60 per cent would typically be discharged as condensed water 21, and 40 per cent contained as water vapor in waste gases 65. Using natural gas, in the embodiment shown with rotary furnace 9 fired with dewatered top gas 20 and oxygen, the minor portion of the top gas is divided approximately half-and-half, between burner 32 and the furnace (burners 11, 12), and amounts to a total of about 560 standard cubic meters per ton of iron produced, or 280 cubic meters each for furnace and combustion chamber, respectively.

Burners 11, 12 and 31 are preferably each valved for alternative firing directly with hydrocarbon fuel, or with recycled top gas, or a combination of these fuels. As well as use during steady-state operations, this can be particularly useful during start-up periods. For example, combustion chamber 32 can be fired with natural gas and a deficiency of oxidant to externally generate a reducing gas at 35 by partial combustion, which is by-passed to substitute for, and augment top gases 20 for entry into blower 24 and then be enriched at 26, 27. Furnace 9 may be fired at the same time with natural gas, utilizing the combustion products 13 in exchanger 29 to adjust the temperature of gases 30 entering the reactor for cracking and reduction of a stationary or only periodically descending charge. As firing and feed rates are increased, the system may then be progressively transferred to a steady-state mode such as illustrated. Burners 11 and 12 could be fired with natural gas, or with preheated air rather than oxygen during steady-state operation, and oxygen could be employed to fire chamber 34, or they could be fired with fuel oil, powdered coal or other hydrocarbons, these selections being influenced by comparative costs.

FIG. 1 is a simplified diagram illustrative of the concept, and numerous details, such as by-passes, sensors and controls are not shown. It is also intended to encompass numerous variations. For example, separate recuperation and discharge circuits could be employed for rotary furnace combustion products 13 and combustion chamber products 35, considering that the former contains some loading of particulates and the latter does not. In either case, the hot gas entry (bottom, as illustrated) would typically be of ceramic, rather than metallic construction, considering the high temperatures. A regenerative exchanger system could also be employed. These numerous variations are known and available from the art of industrial heat transfer. Also, a cloth filter dust collector would usually require some additional cooling of exhaust gases 5 1, usually by dilution with supplementary air, atomized water or steam. Supplementary steam can also be introduced, in addition to hydrocarbon 26, as part of enriched gas mixture 28, such as when depressed deposition of carbon is desired or possible enhancement of reforming and other reactions as within zone 37. Likewise, some components may be omitted, for example, heat exchanger 18 or 29, or both of them, could be eliminated with principal effect only some increase in fuel usage and process heat consumption.

Referring to FIG. 2, it win also be seen that iron oxide reduction to iron carbide, $Fe_3C$., is favored over reduction to metallic iron at temperatures below about 670°–770° C. At such lower temperature, decomposition of hydrocarbons such as methane, particularly in the presence of iron as a catalyst, may also result in the deposition of carbon as soot or the like on the surface or the iron particles, also increasing the carbon content of the iron in the reactor discharge. In the art of iron reduction, reactors are known of the fluidized bed, shaft furnace or retort type, designed specifically to yield solid iron carbide product, typically operating in the 550°–600° C. temperature range. The general flowsheet, FIG. 1, may also incorporate these lower-temperature reactors as reactor 1, adjusting flow rates, temperatures and pressures according to the modified material and energy balances involved.

In another variation, according to known reduction reactor practice, cooling recarburizing gas containing supplementary hydrocarbon, usually methane in natural gas, is injected into the lower section of the reactor between gas inlet 3 and solids outlet 5, with the effect of converting a substantial proportion of the iron into iron carbide, $Fe_3C$, prior to transfer into rotary furnace 9. In these circumstances, the iron-bearing material transferred win contain from about 2 to 6 per cent carbon by weight, the value within this range depending upon the proportion of iron combined with carbon as iron carbide, as well as free elemental carbon deposited. After carburization takes place, the gas flows upwards within the reactor to mix with the reducing gases formed by injection of enriched gas mixture 4 at inlet 3. A substantial proportion of this carbon becomes available as fuel for combustion within the rotary furnace, or residual post-combustion in chamber 45. Carbon oxidation may also be initiated by direct oxygen lance injection into bath 42, generating a $CO/CO_2$ mixture, with the CO being post-combusted to $CO_2$ above the bath or within chamber 45.

It win be appreciated that a process for direct iron and steelmaking from iron ore material or the like has been described and illustrated and that modifications and variations may be made by those skilled in the art, without departing from the scope of the invention defined in the appended claims.

I claim:

1. A process for direct iron and steelmaking comprising the following steps, in combination:
   a) maintaining a gas-solid reaction zone within a reduction reactor adapted for heating and reduction of a charge of iron oxide materials to obtain metallic iron, by contact with hot process gases containing $H_2$ and CO;
   b) maintaining a gas-solid-liquid reaction zone within a rotary furnace adapted for melting within a partially fused bath by heat transferred from the rotating furnace walls in contact with said bath during furnace rotation;
   c) feeding iron oxide materials into said reduction reactor;
   d) transferring said solid metallic iron from said gas-solid reaction zone into said gas-solid-liquid reaction zone substantially without cooling or exposure to the outside atmosphere of said iron;
   e) supplying heat by introducing fuel and oxidant for combustion to form hot gaseous combustion products comprising $CO_2$ and $H_2O$ within said rotary furnace from which heat is transferred to said walls and said bath, thereby melting said solid metallic iron to form liquid metallic iron in said gas-solid-liquid reaction zone;
   f) exhausting top gas containing $H_2O$ and $CO_2$ as well as unreacted $H_2$ and CO from said gas-solid reaction zone;
   g) removing a major portion of the $H_2O$ contained in said top gas;
   h) mixing a major portion of said dewatered top gas together with reducing gases to form an enriched gas mixture;
   i) exhausting said gaseous combustion products of said fuel and oxidant in step (e) from said rotary furnace and transferring sensible heat contained therein to comprise sensible heat of said enriched gas mixture from step (h);
   j) supplying additional heat to said enriched gas mixture sufficient to sustain said heating and reduction of iron oxide materials to yield hot solid metallic iron;
   k) recycling said enriched gas mixture into said reduction reactor; and
   l) discharging of said liquid metallic iron and slag from said gas-solid-liquid reaction zone.

2. A process according to claim 1 wherein said reducing gases in step (h) comprise hydrocarbons and step (k) includes recycling said enriched gas mixture into said reduction reactor at a location to contact reduced metallic iron, said iron acting as a catalyst for reacting, in substantial proportion, said hydrocarbons to form $H_2$ and CO contained in said hot process gases which react with said iron oxide materials to yield said solid metallic iron.

3. A process according to claim 1 wherein step (j) comprises combusting a minor portion of said dewatered top gas with oxidant to produce hot gaseous combustion products and transferring sensible heat contained therein to comprise sensible heat of said enriched gas mixture from step (g).

4. A process according to claim 1 wherein said reducing gases in step (h) comprise hydrocarbons and step (k) includes recycling said enriched gas mixture into said reduction reactor at a location to contact reduced metallic iron, said iron acting as a catalyst for reacting, in substantial proportion, said hydrocarbons to form $H_2$ and CO contained in said hot process gases which react with said iron oxide materials to yield said solid metallic iron and step (j) comprises combusting a minor portion of said dewatered top gas with oxidant to produce hot gaseous combustion products and transferring sensible heat contained therein to comprise sensible heat of said enriched gas mixture from step (h).

5. A process according to claim 1 wherein said reducing gases in step (h) comprise $H_2$ and CO obtained by catalytic reforming by reaction of hydrocarbons with $H_2O$.

6. A process according to claim 1 wherein said reducing gases in step (h) comprise a partially oxidized combustion product containing $H_2$ and CO from partial combustion of hydrocarbons with oxygen.

7. A process according to claim 1 wherein said reducing gases in step (h) comprise $H_2$ and CO obtained by catalytic reforming by reaction of hydrocarbons with a major portion of said dewatered top gas from step (g).

8. A process according to claim 1 wherein said reducing gases in step (h) comprise $H_2$ and CO obtained by catalytic reforming by reaction of hydrocarbons with a major portion of said dewatered top gas from step (g); and step (j) comprises combusting a minor portion of said dewatered top gas with oxidant to produce hot gaseous combustion products and transferring sensible heat contained therein to comprise sensible heat of said enriched gas mixture from step (h).

9. A process according to claim 1 also including the step of introducing fluxing materials into said gas-solid-liquid reaction zone to mix with the gangue, impurities and residual oxides of said iron oxide materials comprising a layer of slag forming to float upon said partially fused bath in step (b) and discharging said slag in step (l), in addition to said liquid metallic iron.

10. A process according to claim 1 wherein step (g) also includes removing a major portion of the $CO_2$ contained in said top gas whereby said dewatered top gas also contains substantially less $CO_2$ than said top gas.

11. A process according to claim 1, 2, 3, 4, 5, 6, 7, 8, 9, or claim 10 wherein said fuel for combustion within said rotary furnace in step (e) comprises another minor portion of said dewatered top gas.

12. A process according to claim 1, 2, 3, 4, 5, 6, 7, 8, 9, or claim 10 wherein the major portion of said oxidant supplied in step (e) comprises gaseous oxygen.

13. A process according to claim 3, claim 4 or claim 8, wherein the major portion of said oxidant supplied in step (e) comprises gaseous oxygen and the major portion of said oxidant supplied in step (i) comprises air.

14. A process according to claim 1, 2, 3, 4, 5, 6, 7, 8, 9 or claim 10, wherein enriched gas mixture from step (h) is heated to a temperature in the range of 850°–1150° C. by steps (i) and (j) for recycling in step (k).

15. A process according to claim 1, 2, 3, 4, 5, 6, 7, 8, 9, or claim 10, wherein enriched gas mixture from step (g) is heated to a temperature in the range of 1000°–1100° C. by steps (i) and (j) for recycling in step (k).

16. A process according to claim 1, 2, 3, 4, 5, 6, 7, 8, 9, or claim 10, also including the step of introducing additional materials, selected from the group consisting of scrap iron and steel, fluxing materials, alloying materials and carbon as additives directly into said rotary furnace for melting and reaction along with said metallic iron transferred from said reactor in step (d).

17. A process according to claim 1, 2, 3, 4, 5, 6, 7, 8, 9 or claim 10, also including the step of extracting sensible heat contained in the top gas in step (g) prior to said removing of water vapor, for in-process recovery and recycling as part of the sensible heat contained in said enriched gas mixture in step (k).

18. A process according to claim 1, 2, 3, 4, 5, 6, 7, 8, 9, or claim 10, in which a layer of slag, including constituents from fusion of gangue and residual iron oxides contained in said iron oxide materials, has formed floating on the partially fused bath in step (b), also including the steps of:

providing a gas-liquid reaction zone within said rotary furnace into which said discharging of liquid metallic iron and slag in step (l) takes place;

adjusting the temperature and composition of said liquid iron by controlled combustion of fuel and oxidant within said gas-liquid reaction zone to yield liquid iron and steel of controlled temperature and composition; and discharging said liquid iron and steel from the gas-liquid reaction zone; and discharging the major portion of said slag from said gas-liquid reaction zone separately from the metal.

19. A process according to claim 1, 2, 3, 4, 5, 6, 7, 8, 9, or claim 10, in which a layer of slag, including constituents from fusion of gangue and residual iron oxides contained in said iron oxide materials, has formed floating on the partially fused bath in step (b), also including the steps of:

providing a gas-liquid reaction zone within said rotary furnace into which said discharging of liquid metallic iron and slag in step (l) takes place;

adjusting the temperature of said liquid iron by controlled combustion of fuel and oxidant within said gas-liquid reaction zone;

siphoning the molten metallic iron from said rotary furnace into a vacuum withdrawal vessel;

making alloy additions to said withdrawal vessel to adjust the composition of said liquid iron prior to casting; and discharging the major portion of said slag from said gas-liquid reaction zone separately from the metal.

20. A process according to claim 1, 2, 3, 4, 5, 6, 7, 8, 9, or claim 10, in which a layer of slag, including constituents from fusion of gangue and residual iron oxides contained in said iron oxide materials, has formed floating on the partially fused bath in step (b), also including the steps of:

providing a gas-liquid reaction zone within said rotary furnace into which said discharging of liquid metallic iron and slag in step (l) takes place;

controlling and adjusting the temperature of said liquid iron by controlled combustion of fuel and oxidant within said gas-liquid reaction zone;

siphoning the liquid metallic iron from said rotary furnace into a vacuum withdrawal vessel in which said steps (a) to (l) inclusive of claim 23 and said siphoning are being conducted concurrently and continuously; and discharging the major portion of said slag from said gas-liquid reaction zone separately from the metal.

21. A process according to claim 1, 2, 3, 4, 5, 6, 7, 8, 9, or claim 10, also including the steps of providing a gas-liquid reaction zone within said rotary furnace into which said discharging of liquid metallic iron and slag in step (l) takes place;

heating said gas-liquid reaction zone directly by a burner proximate the discharge end of said rotary furnace thereby controlling the temperature of said discharging liquid iron and steel; and heating said gas-solid-liquid reaction zone directly by a charge end burner in combination with heat from combustion products of said discharge end burner flowing through said gas-solid-liquid reaction zone countercurrent to the general movement of the charge through said rotary furnace.

22. A process according to claim 1, 2, 3, 4, 5, 6, 7, 8, 9, or claim 10, wherein step (a) also yields iron carbide as a solid chemical compound which is also transferred into said rotary furnace along with said metallic iron in step (d) and in which said enriched gas mixture from step (h) is heated only to a temperature in the range of about 500° to 850° C. by steps (i) and (j).

23. A process according to claim 1, 2, 3, 4, 5, 6, 7, 8, 9, or claim 10, also including the step of injecting supplementary hydrocarbon into said reactor prior to said transferring in step (d) for reaction with iron to yield iron carbide as a solid chemical compound, replacing a portion of said metallic iron as the material yielded in step (a) and transferred to said rotary furnace in step (d).

* * * * *